Jan. 3, 1956

A. W. ERNESTUS 2,729,313

BOLTED METAL SILO CONSTRUCTION

Filed Aug. 10, 1949

INVENTOR.
Adolph W. Ernestus
BY
Andrus & Scealer
ATTORNEYS.

Jan. 3, 1956    A. W. ERNESTUS    2,729,313
BOLTED METAL SILO CONSTRUCTION
Filed Aug. 10, 1949    2 Sheets-Sheet 2
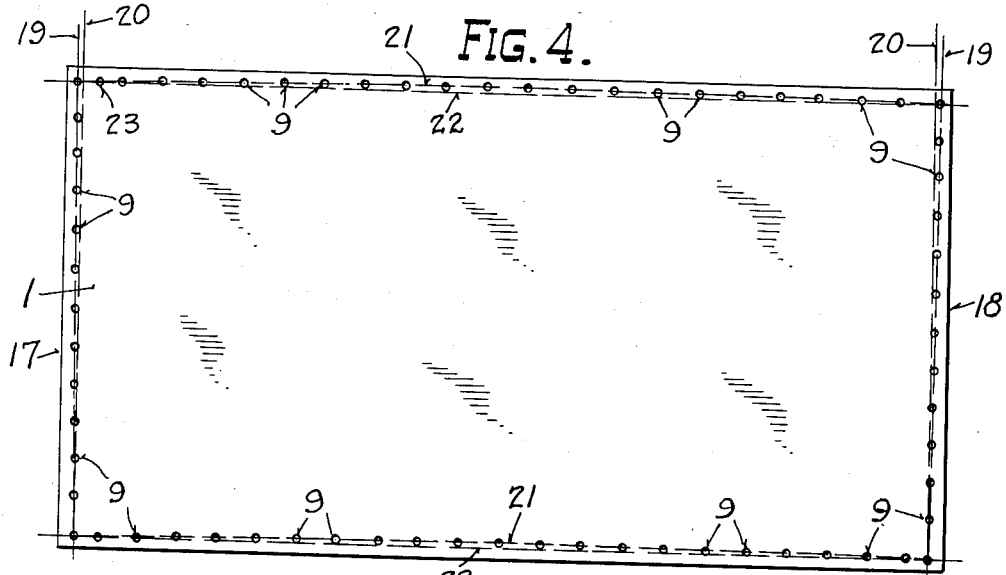
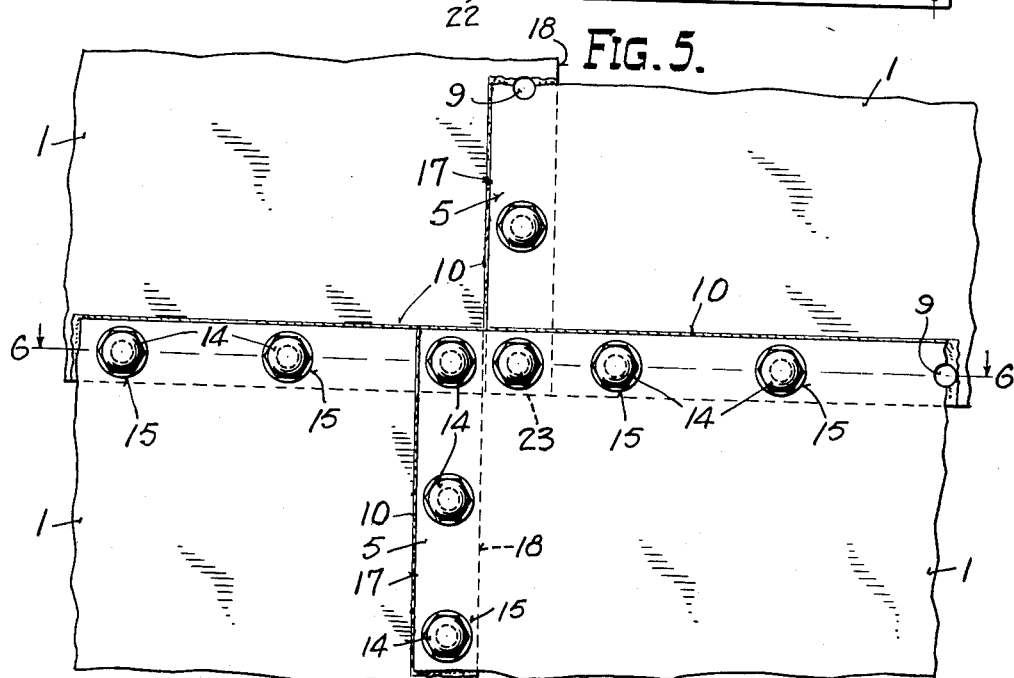
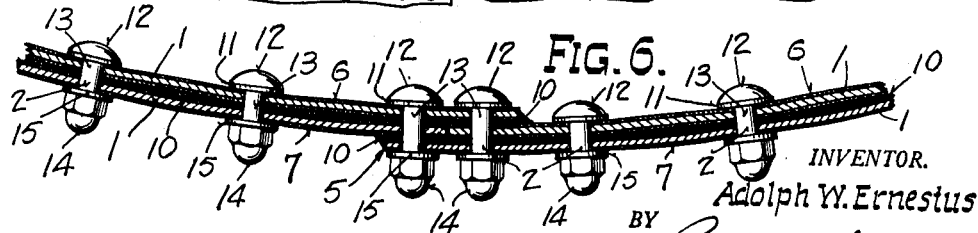
INVENTOR.
Adolph W. Ernestus
BY
Andrus & Sceales
ATTORNEYS.

United States Patent Office 2,729,313
Patented Jan. 3, 1956

2,729,313

BOLTED METAL SILO CONSTRUCTION

Adolph W. Ernestus, Milwaukee, Wis., assignor to A. O. Smith Corporation, Milwaukee, Wis., a corporation of New York Application August 10, 1949, Serial No. 109,507

3 Claims. (Cl. 189—3)

This invention relates to a bolted metal silo construction wherein the plates may be vitreous enameled and sealed to each other to provide an airtight corrosion resistant structure.

One of the principal objects of the invention is to provide a silo that can be more readily assembled in the field.

Another object of the invention is to provide a silo in which the seams are more readily and permanently sealed against the leakage of air into the silo.

Another object is to facilitate the enameling of the plates and shipping and handling of the same in erection.

Another object is to improve the unloading characteristics of the silo where a bottom unloader is employed.

Another object is to provide a bolt for assembling bolted silos which will not interfere with silage removal and which can be applied without injury to the enamel lining of the silo.

Another object is to place the bolt holes in the plates in a manner to compensate for the overlapping thicknesses and provide for a standard plate construction.

Other objects and advantages will appear from the following description of an embodiment of the invention.

In carrying out the invention the holes in the plates are arranged to provide an offsetting of the vertical seams so that only three plates overlap at any one location, whereby the plates may be assembled and sealed without kinks or bends tending to injure the enamel lining and to make sealing difficult.

Each tier of plates is constructed to have its upper edge overlap on the outside of the lower edge of the next tier, and in order that the plates may be of standard dimensions each is constructed to have its upper edge curve upon a slightly larger radius than its lower edge to compensate for the overlapping thicknesses and maintain a generally uniform diameter for the silo from bottom to top.

The holes along the vertical edges of the plates are disposed along a line at a slight outward angle from the vertical to compensate for the overlapping thicknesses so that the general diameter of the silo remains the same at each horizontal seam and the plates may be of standard construction. The holes along the horizontal edges of the plates are disposed along a slightly arched line from the horizontal to compensate similarly for the radial offsetting of the plate as between the top and bottom edges in assembly.

The bolts are constructed with relatively shallow slightly crowned heads to be disposed on the inside of the silo and which are preferably enameled to prevent corrosion and to provide a smooth glass-like surface which does not interfere with the downward movement of the silage within the silo. The outer end of each bolt is covered by a cap nut to prevent rusting of the threads and possible injury thereto.

The outside of the silo and of the cap nuts may be coated with vitreous enamel to protect the same against rusting.

The plates are sealed airtight at the seams by means of a suitable rubber strip inserted therebetween during assembly and which is compressed during tightening of the bolts. Each bolt is similarly sealed by means of a washer placed beneath the bolt head and which is compressed during tightening of the bolt.

The invention is made possible only by maintaining very close tolerances in the initial drilling of the holes in the plates and it is well for this purpose to maintain a tolerance substantially less than plus or minus five ten-thousandths of an inch. Close tolerances are necessary in order that the holes register properly and the bolts fit therein to hold the structure rigid against wind pressures.

The invention is illustrated in the accompanying drawings in which:

Fig. 4 is an enlarged elevational view of a single plate showing the holes therein;

Fig. 5 is an enlarged detail elevational view showing a corner assembly for four plates; and Fig. 6 is a section taken on line 6—6 of Fig. 5.

Figure 1:
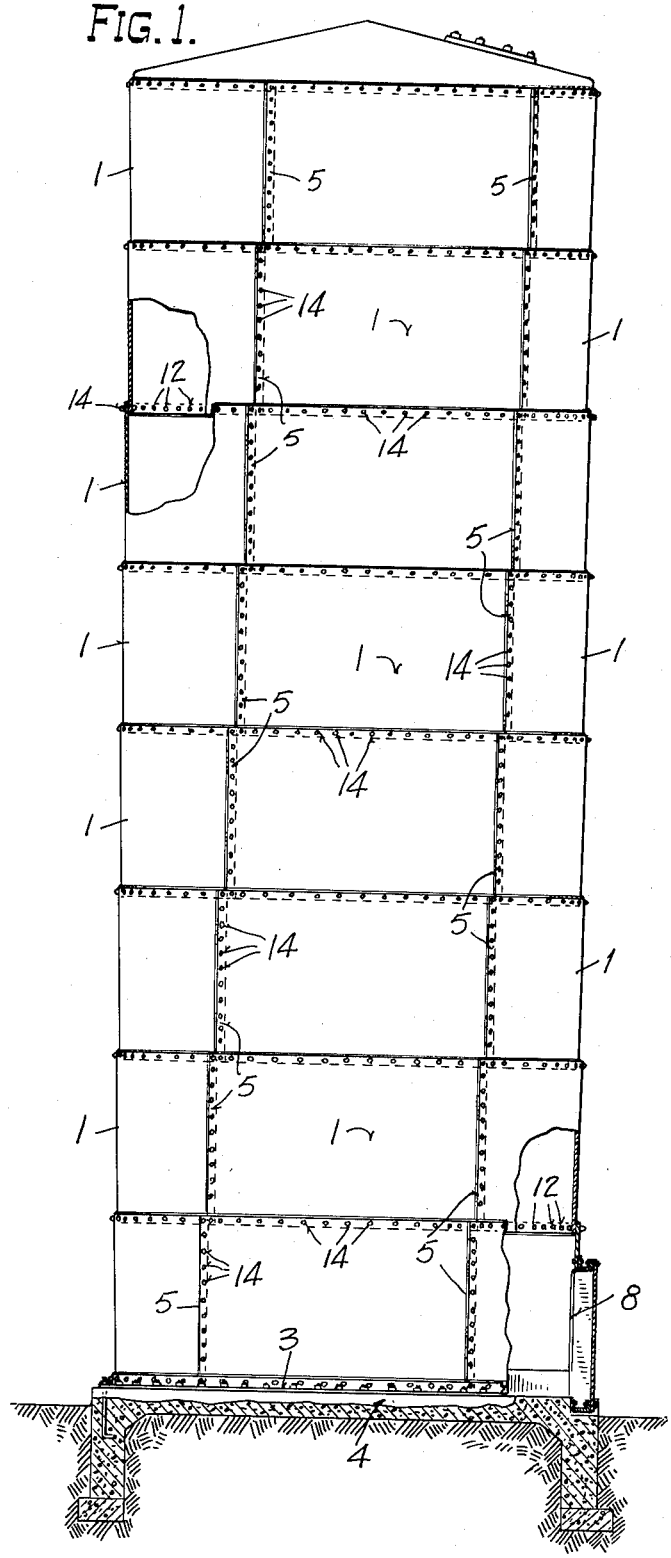
Figure 1 is a side elevation of a silo embodying the invention, with parts broken away and sectioned.
Figure 2:
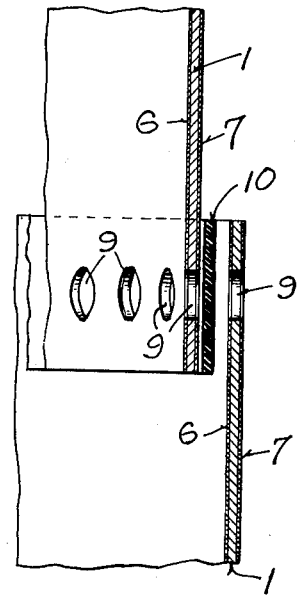
Fig. 2 is an enlarged detail sectional view showing the initial positioning of the calking tape in the assembly of a seam.

The silo illustrated comprises a plurality of plates 1 arranged in successive circular tiers with the edges of adjacent plates overlapping and bolted together by bolts 2 passing therethrough.

The bottom tier of plates is anchored by bolts 2 to a circular angle iron base 3 secured to a cement foundation 4. The upstanding flange of base 3 overlaps the tier of plates on the outside and the bolts 2 extend radially through the plates of the tier and the flange of the base to secure the same together.

Each tier of plates is made up of any suitable number of plates 1 disposed on edge with their corresponding ends overlapping the ends of adjacent plates and secured thereto by bolts 2 passing radially therethrough.

The same number of plates is disposed in each tier so that each tier has the same number of vertical seams 5. The vertical seams of each tier above the lowermost tier are offset laterally in a given direction from the corresponding vertical seams of the next adjacent lower tier. This offsetting of the seams of the present invention is not the same as the staggering of seams in previous tank construction wherein the seams of one tier were disposed centrally of the adjacent plates of the next upper and lower tiers.

The plates 1 are of substantially identical length and width and are constructed and shipped flat to the site for the erection of the silo. Each plate 1 is of steel or suitable alloy coated with a ceramic or vitreous enamel which is fired to provide a glass-like lining 6 for the silo. If desired, the outside of the silo may be similarly and at the same time coated with vitreous enamel 7 to provide a substantially permanent protection for the silo against rusting.

In the construction illustrated there are five plates 1 for each tier of the silo. One of the plates for the bottom tier is constructed with an opening 8 for receiving the unloader mechanism, not shown. The other plates are all rectangular and continuous with the exception of the bolt holes 9 along the edges thereof.

The bolt holes 9 are drilled or punched in the individual plates at predetermined locations which provide for tight seams along the overlapping edges of the plates, for the overlapping of only three plates for any total thickness at the corners, and for a frusto-conical effect in each tier compensating for the thickness of the plates being overlapped on the horizontal seams.

The tight seams are provided by adequate close spacing of the holes 9 and bolts 2 along the edges of the plates. For this purpose the holes 9 should be equidistant in spacing and it is well to have sufficient closeness of the holes to avoid any substantial deformation or separation of the plates at the seams between the adjacent holes.

The seams are sealed for air tightness by a calking strip 10 of rubber or the like and which is initially applied to the surface of one of the plates along the edge or edges to be overlapped by an adjacent plate.

The bolts 2 may be sealed by similar calking material or by an asbestos washer 11 disposed beneath the head 12 of the corresponding bolt.

Each bolt 2 has a cylindrical shank 13 and is disposed with its head 12 on the inside of the silo so that the washer 11 engages the enamel lining 6 and seals between the same and the bolt.

The head 12 of each bolt is crowned and shallow so that it protrudes into the silo a minimum distance to reduce interference with downward movement of the silage during processing or unloading.

The nut 14 on the outer end of each bolt 2 is of the cap nut type to cover the end of the bolt and protect it from the atmosphere. A heavy flat metal washer 15 is disposed between each nut 14 and the outer enamel surface 7 of the silo.

Figure 3:
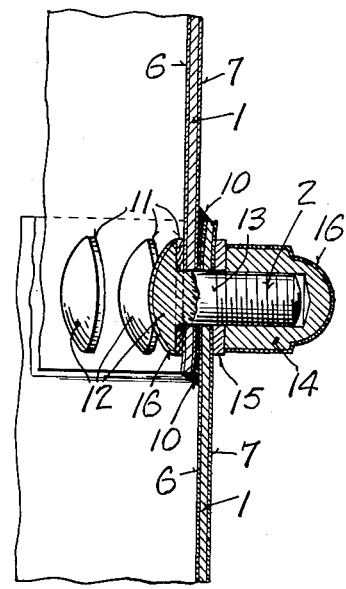
Fig. 3 is an enlarged detail sectional view showing a bolt and its application to a seam of the silo.

The bolts 2 and nuts 14 therefor may be constructed of non-rusting metal such as stainless steel, or they may be enameled with vitreous enamel similar to coatings 6 and 7. The bolts 2, shown in the drawing, have a vitreous enamel coating 16 over the heads 12, and a similar coating 16 over the nuts 14, see Fig. 3. It has been found that a reasonable tightness of bolt may be attained with a torque limiting wrench without injuring the enamel 16.

The holes 9 in the embodiment of Figs. 1 to 6 are circular and are located in accurate relation to one of the vertical edges of the corresponding plate, which is herein referred to as the index edge 17.

Edge 17 and the opposite end edge 18 of each plate 1 have the holes 9 positioned exactly equidistant along a straight line 19 which extends upwardly at an outward angle to a perpendicular 20 drawn from the center of the lowermost hole 9 when the plate is on edge, to compensate for the enlargement in diameter of the tier at its upper edge for receiving therein the lower edge of the next succeeding tier. This angular offset of line 19 from line 20 need be only about six hundredths of an inch at the uppermost hole 9 where the uppermost hole 9 is about fifty-five inches from the lowermost hole 9 and the plate thickness is about one-eighth of an inch.

The spacing of the holes 9 along the vertical edges 17 and 18 is in exact correspondence so that the end-to-end positioning of adjacent plates effects alignment of the corresponding holes and of the plates.

The holes 9 along the top and bottom edges of the plate are positioned along a slightly crowned line 21 which curves upwardly from the center of the end holes 9 until it is spaced at its center above the corresponding horizontal center line 22 of the end holes a distance of about twenty-five thousandths of an inch for a plate of the dimensions given above and which is approximately nine feet long. The positioning of the holes 9 along the crowned lines 21 compensates for the slight frusto-conical effect obtained in each tier by reason of the larger diameter at the upper edge for receiving the lower edge of the next succeeding tier, so that the bolt holes of the upper edge will align with the corresponding holes of the next succeeding lower edge.

The spacing of holes 9 along the lower line 21 corresponds to a selected number of unit spaces plus approximately a half of a unit space at each end.

The spacing of holes 9 along the upper line 21 corresponds to one unit space more than the number of unit spaces in the lower line of holes.

Each unit space between holes in the upper line 21 is slightly greater than the unit space between successive holes in the lower line 21 in order to compensate for the larger arc of the upper edge of each tier in overlapping the lower edge of the next succeeding tier. For plates of the dimensions given above, this unit space for holes 9 in upper line 21 may be about six thousandths of an inch greater in length than the unit space between holes in lower line 21.

There is no half unit spacing for the end holes in upper line 21, as described for the holes in lower line 21. Instead, an extra hole 23 is provided in one of the end unit spaces of the upper line, preferably in the space next to index edge 17.

Hole 23 should be spaced from the uppermost hole of the corresponding vertical edge a distance corresponding to the distance between the lowermost hole of the opposite vertical edge and the next succeeding hole along the lower line 21. In this respect it is not necessary that the unit space be divided exactly in half or that the end spaces in the lower line 21 be exactly half of the lower unit space. The end spaces in lower line 21 should be complemental in making up the equivalent total of a full lower unit space, and hole 23 should be positioned as above described.

A corner joint between plates is illustrated in Figs. 5 and 6 in which it is shown that the greatest overlapping thickness is that of three plates at the corner. This overlapping thickness is obtained only for the hole 23 and its next adjacent end hole. In this way the bending of the plates for overlapping purposes is substantially reduced as compared to a joint where four overlapping plates are necessary, and the sealing of the plates against each other is greatly facilitated.

The plates may be coated with enamel in the flat and may be packed in bundles and shipped to the erection site flat. The plates are then curved as the successive tiers are assembled in erecting the silo.

Various embodiments of the invention may be employed within the scope of the accompanying claims.

I claim:

1. In a storage structure, a first panel, a second panel having the lower edge thereof in generally horizontal alignment with the lower edge of said first panel and having a side edge portion overlapping the adjacent side edge portion of said first panel to form a first vertical area of overlap, a third panel having the upper edge portion thereof overlapping the lower edge portion of said first panel to form a first horizontal area of overlap, a fourth panel having the upper edge thereof in generally horizontal alignment with the upper edge of said third panel and having the upper edge portion thereof overlapping the lower portion of said first vertical area of overlap to provide a first area of three overlapping layers, said fourth panel having a side edge portion overlapping the adjacent side edge portion of said third panel to form a second vertical area of overlap with the upper portion of said side edge portion of said fourth panel disposed in overlapping relation with said first horizontal area of overlap to provide a second area of three overlapping layers disposed immediately adjacent said first area of three overlapping layers, a bolt disposed through aligned openings in each area of three overlapping layers, and a series of bolts disposed in spaced relation in aligned openings in each of said vertical and horizontal areas of overlap.

2. A storage structure, comprising a series of generally cylindrical vertically superimposed sections with the upper edge portion of each section being secured in overlapping relation to the lower edge portion of the adjacent upper section, each of said sections being formed of a plurality of generally arcuate panels joined together at the side edge portions thereof in lapping relation to form a vertically extending lap joint, the vertical lap joints of one section being circumferentially offset from the vertical lap joints of the adjacent sections a distance generally equal to the width of said vertical lap joints.

3. In a storage structure, a first panel, a second panel having the lower edge thereof in general alignment with the lower edge of said first panel and having a side edge portion overlapping the adjacent side edge portion of said first panel to provide a vertically extending lap joint between the panels, a third panel having the upper edge portion thereof overlapping the lower edge portion of said first panel and with the upper portion of a side edge thereof disposed in substantial abutting relation with the lower portion of the adjacent side edge of said second panel, a fourth panel having the upper edge thereof in general alignment with the upper edge of said third panel and having the upper edge portion overlapping the lower edge portion of said second panel, said fourth panel having a side edge portion overlapping the adjacent side edge portion of said third panel to provide a second vertically extending lap joint, said second lap joint being circumferentially offset from said first lap joint a distance substantially equal to the width of said first lap joint, and means for securing the overlapping portions of the panels together to form a fluid-tight joint between the panels.

References Cited in the file of this patent

UNITED STATES PATENTS

| | | |
|---|---|---|
| 234,186 | Hendrick | Nov. 9, 1880 |
| 1,076,382 | Maloney | Oct. 21, 1913 |
| 1,100,081 | Kramer | June 17, 1914 |
| 1,242,935 | Harrison | Oct. 16, 1917 |
| 1,265,966 | Schlafly | May 14, 1918 |
| 1,513,605 | Kramer | Oct. 28, 1924 |
| 1,943,191 | Schwemlein | Jan. 9, 1934 |
| 2,171,221 | Maus | Aug. 29, 1939 |
| 2,250,343 | Zigler | July 22, 1941 |
| 2,379,269 | Barrows | June 26, 1945 |
| 2,490,663 | Van Uum et al. | Dec. 6, 1949 |
| 2,551,217 | Martin | May 1, 1951 |

FOREIGN PATENTS

| | | |
|---|---|---|
| 206,765 | Great Britain | Nov. 15, 1923 |